B. G. LAMME AND W. SYKES.
SPEED CONTROL SYSTEM FOR INDUCTION MOTORS.
APPLICATION FILED MAY 2, 1918.
1,336,566. Patented Apr. 13, 1920.
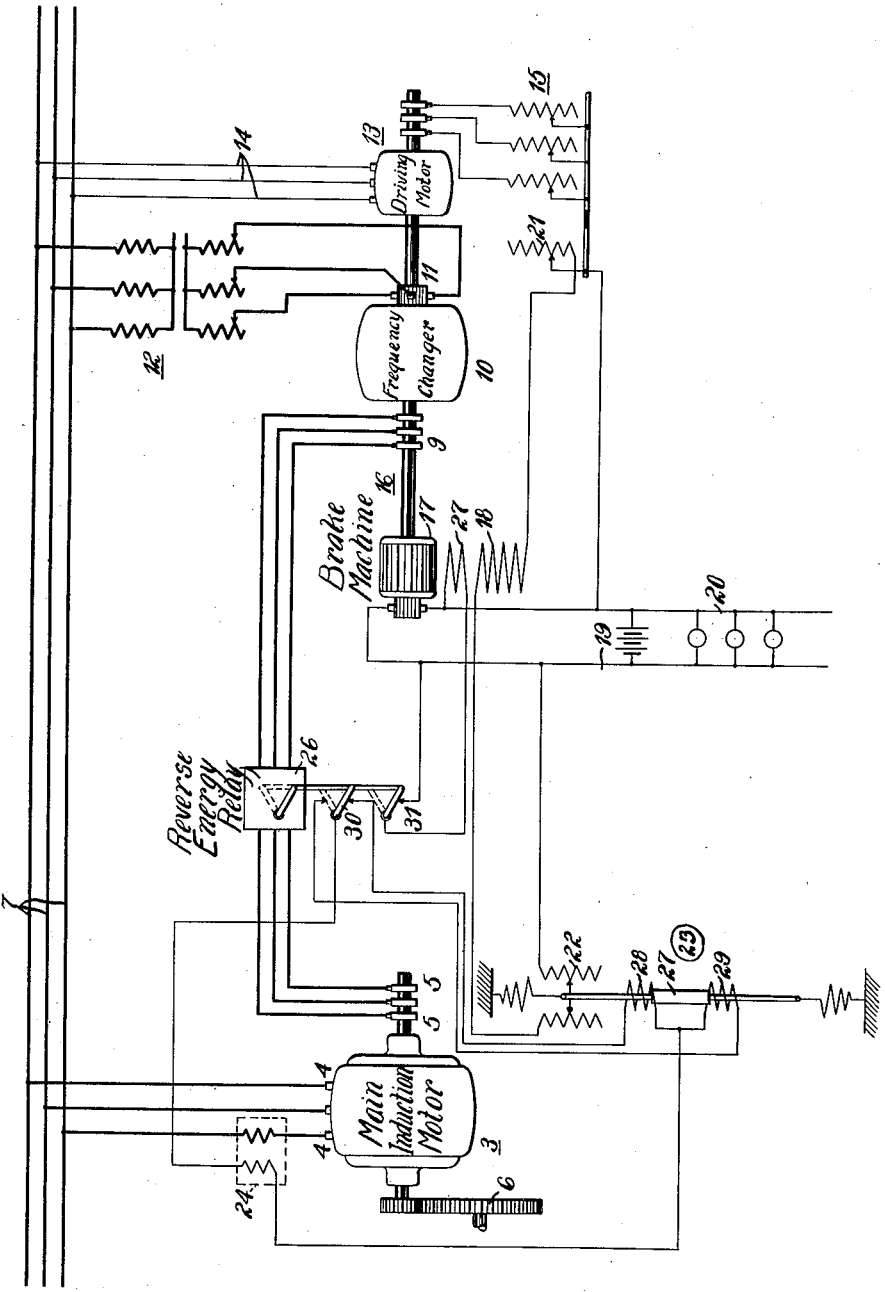
WITNESSES:
J. T. Wurmb.
D. C. Davis.
INVENTOR
Benjamin G. Lamme &
Wilfred Sykes
BY
Wesley G. Carr
ATTORNEY

UNITED STATES PATENT OFFICE.

BENJAMIN G. LAMME AND WILFRED SYKES, OF PITTSBURGH, PENNSYLVANIA, ASSIGNORS TO WESTINGHOUSE ELECTRIC & MANUFACTURING COMPANY, A CORPORATION OF PENNSYLVANIA.

SPEED-CONTROL SYSTEM FOR INDUCTION-MOTORS.

1,336,566. Specification of Letters Patent. Patented Apr. 13, 1920.

Application filed May 2, 1918. Serial No. 232,156.

*To all whom it may concern:*

Be it known that we, BENJAMIN G. LAMME, a citizen of the United States, and a resident of Pittsburgh, in the county of Allegheny and State of Pennsylvania, and WILFRED SYKES, a subject of the King of Great Britain, and a resident of Pittsburgh, in the county of Allegheny and State of Pennsylvania, have invented a new and useful Improvement in Speed-Control Systems for Induction-Motors, of which the following is a specification, this being a continuation in part of application Ser. No. 126,907, filed Oct. 21, 1916.

Our invention relates to systems of control for induction motors, and it has for its object to provide a system that shall be capable of application to induction motors of the largest sizes and which shall be flexible and economical in operation and substantially free from surging and allied harmful phenomena.

In the accompanying drawing, the figure is a diagrammatic view of an induction motor, together with its attendant supply and control circuits, constructed in accordance with a preferred form of our invention.

An old and well known method of varying the speed of a large-capacity induction motor is to connect a frequency-changer and adjustable transformers between the secondary winding thereof and the source. Energy derived from the secondary winding, during under-synchronous operation, is suitably changed in frequency in the frequency-converter and in voltage in the transformer for return to the system. Similarly, energy derived from the system has been appropriately changed in voltage in the transformer and in frequency in the frequency-converter for introduction into the secondary of the main induction motor for over-synchronous operation.

The frequency-changer of the prior systems has either been self-propelled or has been driven by a separate motor. By variations in the speed of said frequency-changer, the desired alterations in the ratio of frequency conversion therein have been obtained.

In a copending application of B. G. Lamme, Serial No. 583, filed January 5, 1915, patented Apr. 15, 1919, No. 1,300,742, and assigned to the Westinghouse Electric and Manufacturing Company, is disclosed a system of the character indicated, and the necessity is shown, for stable operation, of having the frequency imposed upon the secondary of the main induction motor of the frequency-changer (slip frequency) increase with an increase of load upon the main induction motor by substantially the same percentage that the speed of the main induction motor would be reduced because of resistance slip under like load conditions. In other words, the said application points out the desirability of having the load-speed characteristic of the driving motor for the frequency-changer approximate, in shape, the load-speed characteristics of the main induction motor when operating with a suitable amount of resistance in the secondary winding thereof under like conditions of load.

Two distinct methods of obtaining the desired speed adjustment of the frequency converter are disclosed in the aforementioned application. One of these is by driving the frequency-converter by an alternating-current motor of the commutator type and adjusting the field voltage of said motor in accordance with the load on the main induction motor through a current transformer in order to obtain the desired speed adjustment thereof. The other method of speed control is to place a mechanical brake of the electrically-operated type upon the shaft of the frequency-converter and to energize said brake in accordance with the load on the main induction motor. Since the normal load on the motor driving the frequency changer consists solely of the iron, copper, friction and windage losses in the two auxiliary machines, it is apparent that a brake of relatively small dimensions will suffice to produce the desired speed reduction in the frequency-converter.

By the present invention, we provide a system that is similar, in general, to the last-mentioned system but the braking effect is purely electrical in nature, being produced by a dynamo-electric machine operating as a generator to reduce the speed of the frequency-changer when it is desired to lower the speed thereof. A marked advantage of an electrical brake of this character, however, is that it is reversible in function, as contrasted with a mechanical brake; that is to say, the braking machine may be operated as a motor to increase the speed of the frequency converter for proper control of the main induction-motor speed in the over-synchronous ranges, if desired.

Referring to the drawing for a more detailed understanding of our invention, we show a main induction motor at 3, said motor being provided with primary terminals 4—4 and with secondary terminals 5—5 in the form of the usual slip rings. The motor 3 may be mechanically coupled to any desired load such, for example, as a rolling mill, through suitable gearing 6. Energy for the operation of the main induction motor is derived from a suitable supply system 7, shown as of the three-phase type, through cut-out switches and protective apparatus (not shown).

Energy derived from the secondary member of the motor 3 through the slip rings 5—5 is supplied to the slip-rings 9 of a frequency converter 10 of any desired form, such, for example, as that described and claimed in U. S. Patent No. 682,943, issued to the Westinghouse Electric and Manufacturing Company on September 17, 1901, upon an application filed by B. G. Lamme. Briefly speaking, a frequency converter of the character designated comprises an armature the winding of which is connected both to the segments of a commutator and to appropriate slip rings. Said armature is driven at a speed corresponding to the difference in frequency between the input and the output frequencies, as is well known in the art. If said frequency-changer is not of the self-propelled type, the stator thereof may be unprovided with field windings or, in fact, the stator may be done away with entirely and an iron keeper or armature may rotate with the main armature to perform the function of the stator in closing the magnetic circuit.

The commutator 11 of the machine 10 is preferably mounted at the other end thereof from the slip-rings 9 and is connected, through adjustable transformers 12—12, to the supply system 7. The frequency changer 10 is driven by a motor 13 which may be of any desired variable-speed type, being shown in this instance as an induction motor having its primary winding connected to the mains 7 through suitable leads 14 and having its secondary winding connected through suitable slip rings to an adjustable resistor 15.

As pointed out in the aforementioned application of B. G. Lamme, it is desirable, for stable operation of the main induction motor, that the speed thereof fall off with an increase of load, rendering necessary a corresponding speed adjustment of the frequency changer 10.

We achieve this result by mounting a braking dynamo-electric machine 16 on the shaft of the frequency changer 10 or otherwise mechanically coupling the same thereto.

In the form of our invention shown in the drawing, the brake machine 16 is of the direct-current type, comprising an armature 17 and exciting field windings 18 and 27, adapted to be energized from any suitable source of direct current, such, for example, as a storage battery 19 floating across the brushes of said braking machine. The load 19 may be supplemented by additional load, as indicated at 20. The excitation of the main exciting field winding 18 of the brake machine 16 is under the joint control of a resistor 21 arranged to be operated simultaneously with the resistor 15 and of a resistor 22 arranged to be controlled by a relay 23 operable in accordance with the main-load current of the induction motor, as, for example, through a current transformer 24. The relay 23 is provided with two actuating windings 28 and 29 adapted to move the core member 27 in opposite directions, respectively. Whether one or the other of the windings 28 or 29 is energized is determined by a reverse-energy relay 26 applied to the mains between the main motor 3 and the frequency-changer 10. It is well known that, during under-synchronous operation, energy flows from the motor to the frequency-changer and that, during over-synchronous operation, energy flows in the reverse direction. Thus the relay 26 is arranged to occupy its lowermost position during under-synchronous operation and its upper position during over-synchronous operation.

The operation of the relay 26 controls the setting of a two-way switch 30 so that the actuating winding 28 is energized during under-synchronous operation and the actuating winding 29 is energized during over-synchronous operation.

The auxiliary field winding 27 of the machine 16 has its circuit closed through a switch 31, also under the control of the relay 26, the arrangement being such that said field winding is energized during under-synchronous operation and deënergized during over-synchronous operation.

Having thus described the construction of a system embodying our invention, the under-synchronous operation is as follows: Upon starting the main induction motor 3 by any suitable means and bringing the same up, for example, to 75% of synchronous speed, the frequency changer 10 is operated to determine the slip frequency of the secondary winding of said main motor which, in this case, would be 25% of syn- chronous frequency. The desired speed of the frequency changer is obtained by the adjustment of the resistor 15, with consequent alteration of the secondary resistance of the driving motor 13. The transformers 12—12 should be simultaneously adjusted so that the energy derived from the main induction motor, after having been suitably altered in frequency in the frequency changer, may in addition, be suitably altered in voltage for return to the system 7. The aforementioned simultaneous adjustment of the resistor 15 and of the transformers 12—12 may be produced by separate operations, if desired, or said two adjustable elements may be electrically or mechanically interlocked, the specific form of interlocking used constituting no part of the present invention and, therefore, necessitating no further illustration. The reverse-energy relay 26 is in its lowermost position, as shown in full lines, so that the windings 27 and 28 are energized. The excitation of the winding 27 added to that of the winding 18 is sufficient to cause the internal or armature electromotive force of the machine 16 to exceed the voltage of the battery 19, whereby the machine 16 operates as a generator and exerts a braking effect upon the driving motor 13.

Under the conditions above assumed, with a light load on the main induction motor, the braking machine is operated as a generator at such a speed as to supply a small amount of energy to the battery 19, said machine, therefore, producing but little braking effect.

If it be desired to change the speed of the main induction motor, the resistor 15 will be further adjusted and, in so doing, the setting of the resistor 21 will also be changed, decreasing the excitation of the field winding 18 for an increase in the speed of the frequency-changer 10 and vice versa, thus compensating for the changes in the speed of operation of the brake machine.

Let it now be assumed that, for any given speed, the load on the main induction motor increases. The current supplied to the relay 23 increases, cutting out resistance in the resistor 22 and increasing the excitation of the field winding 18, thus raising the output voltage and, therefore, the braking effect of the brake machine 16.

If it be desired to operate the induction motor above synchronous speed, it is desirable, for stability, that the motor speed slightly increase with an increase of the load, rather than decrease, as in the under-synchronous speed ranges. In other words, it is desirable that the effect of a negative resistance slip be imparted to the induction-motor operating characteristics.

We may readily produce the desired result by operating the brake machine 16 as a motor during over-synchronous operation, the driving torque exerted by said machine upon the frequency changer varying with the load of the main motor, as previously described.

Upon carrying the main motor through synchronism as, for example, by driving the frequency-changer 10 up through synchronism, the relay 26 moves to its upper position, deënergizing the windings 27 and 28 and energizing the winding 29. The removal of the excitation of the field winding 27 causes the internal electromotive force on the machine 16 to fall below the electromotive force of the battery 19, whereby the direction of current flow through the machine 16 is reversed, causing motor operation thereof. The machine 16 now assists the machine 13 in driving the motor 10 and may even cause the machine 13 to operate as a generator, returning energy to the system.

Having placed the system in over synchronous operation at light load, let it be assumed that the load on the main motor increases. The core member 27 is drawn into the solenoid 29, increasing the effective resistance of the resistor 23 and weakening the field excitation of the machine 16, whereby said machine tends to operate at higher speed, increasing the speed of the frequency-changer 10 and, accordingly, slightly increasing the secondary frequency of the main motor 3. This results in the desired speed modification of the main motor to obtain stability.

While we have shown our invention in a preferred form, it will be obvious to those skilled in the art that it is not so limited but is susceptible of various minor changes and modifications without departing from the spirit thereof, and we desire, therefore, that only such limitations shall be placed thereupon as are imposed by the prior art or are indicated in the appended claims.

We claim as our invention:

1. The combination with an induction motor, of a frequency-changer connected to determine the slip-frequency thereof, adjustable-speed driving means for said frequency-changer, an auxiliary dynamo-electric machine coupled to said frequency-changer, means for causing said auxiliary machine to operate either as a motor or as a generator, and means dependent upon the load of said induction motor for varying the motoring or generating effect of said auxiliary machine.

2. The combination with a source of alternating current, of an induction motor having its primary winding connected thereto, a frequency-changer and an adjustable transformer connected between the secondary winding of said motor and said source for the interchange of energy therebetween, driving means for said frequency-changer having a falling load-speed characteristic, an auxiliary dynamo-electric machine coupled to said frequency-changer and arranged to operate either as a generator or as a motor, and means for increasing the generator action and braking effect of said auxiliary machine upon an increase in the main motor load during under-synchronous operation, to slightly increase the slip-frequency thereof, and for increasing the motor action and driving effect of said auxiliary machine upon an increase in the main motor speed during over-synchronous speed to also increase the slip frequency thereof.

3. In a system of control, the combination with a dynamo-electric machine having a primary and a secondary winding, of an auxiliary regulating machine connected to said secondary winding, an alternating-current supply circuit, a driving motor for said auxiliary machine, a braking generator coupled to said driving motor, and electro-responsive means actuated in accordance with the load on said first machine for automatically varying the braking effect of said generator.

4. In a system of control, the combination with an induction motor having a primary and a secondary winding, of an auxiliary frequency converter connected to said secondary winding, an alternating-current supply circuit, a driving motor for said converter connected to said circuit, a braking generator coupled to said driving motor, and electro-responsive means actuated in accordance with the load on the induction motor for automatically producing such braking effect in said generator as to regulate the speed in said driving motor in substantial accordance with the "resistance slip" of the induction motor.

5. In a system of control, the combination with an alternating-current supply circuit, of a main induction motor, connections from said circuit to the primary winding of said motor, a frequency-changer and an adjustable transformer, connections, including said frequency-changer and transformer, between the secondary terminals of said motor and said circuit, means for driving said frequency-changer at either under-synchronous or over-synchronous speeds in order to determine the frequency and phase sequence of the secondary currents of said motor, an auxiliary dynamo-electric machine coupled to said frequency-changer, means for causing said auxiliary machine to operate as a generator during under-synchronous operation of said frequency-changer and as a motor during over-synchronous operation thereof, and means for regulating the motoring or generating action of said auxiliary machine in accordance with the load on said main motor.

6. In a system of control, the combination with an alternating-current supply circuit, of a main induction motor, connections from said circuit to the primary winding of said motor, a frequency-changer and an adjustable transformer, connections, including said frequency-changer and transformer, between the secondary terminals of said motor and said circuit, means for driving said frequency-changer at either under-synchronous or over-synchronous speeds in order to determine the frequency and phase sequence of the secondary currents of said motor, an auxiliary dynamo-electric machine coupled to said frequency-changer and provided with main and auxiliary exciting windings, an auxiliary source of substantially constant electromotive force connected to said auxiliary machine, switching means for causing the cumulative energization of said field windings during under-synchronous operation of said main motor, whereby the armature electromotive force of said auxiliary machine exceeds the electromotive force of said auxiliary source and said auxiliary machine operates as a generator in exerting a braking effect upon said driving means, said switching means further causing the deënergization of said auxiliary field winding during over-synchronous operation of said main motor, whereby the armature electromotive force of said auxiliary machine is rendered less than the electromotive force of said auxiliary source and said auxiliary machine is caused to operate as a motor, and means for automatically adjusting the motoring or generating effects of said auxiliary machine, respectively, in direct accordance with the load on said main motor.

7. In a system of control, the combination with an alternating-current supply circuit, of a main induction motor, connections from said circuit to the primary winding of said motor, a frequency-changer, and an adjustable transformer, connections, including said frequency-changer and transformer, between the secondary terminals of said motor and said circuit, means for driving said frequency-changer at either under-synchronous or over-synchronous speeds in order to determine the frequency and phase sequence of the secondary currents of said motor, an auxiliary dynamo-electric machine coupled to said frequency-changer, a reverse-energy relay connected between the main motor secondary winding and said supply circuit, an auxiliary current source connected to the terminals of said auxiliary machine, means whereby said relay causes the armature electromotive force of said auxiliary machine to exceed the electromotive force of said auxiliary source during under-synchronous operation of said main motor and further causes the armature electromotive force of said auxiliary machine to be less than the electromotive force of said auxiliary source during over-synchronous operation of said main machine, and means for automtically strengthening the field of said auxiliary machine during under-synchronous operation of said main motor with a load increase thereof and for weakening the field of said auxiliary machine during over-synchronous operation of said main motor with a load increase thereof.

8. The combination with an induction motor, of a frequency-changer arranged to regulate the secondary frequency thereof both during under-synchronous and over-synchronous operation, and means for slightly increasing the secondary frequency imparted to said motor by said frequency-changer during either phase of operation with a load increase on said motor.

In testimony whereof we have hereunto subscribed our names this 29th day of April, 1918.

BENJ. G. LAMME.
WILFRED SYKES.